United States Patent [19]

Ito et al.

[11] 4,324,708

[45] Apr. 13, 1982

[54] METALLIC PAINTING

[75] Inventors: Satoru Ito; Tadashi Watanabe; Shinji Sugiura, all of Hiratsuka, Japan

[73] Assignee: Kansai Paint Co., Ltd., Hyogo, Japan

[21] Appl. No.: 202,763

[22] Filed: Oct. 31, 1980

Related U.S. Application Data

[62] Division of Ser. No. 134,140, Mar. 26, 1980.

[30] Foreign Application Priority Data

Apr. 5, 1979 [JP] Japan ................................. 54-40305

[51] Int. Cl.$^3$ ........................... C08L 1/10; C08L 1/14
[52] U.S. Cl. .................................. 524/599; 427/388.5; 427/409; 428/463; 428/464; 527/314; 524/441
[58] Field of Search ............... 260/13, 17.4 UC, 17 A, 260/42.22; 427/388.5, 409; 428/463, 464

[56] References Cited

U.S. PATENT DOCUMENTS

| | | | |
|---|---|---|---|
| 3,277,031 | 10/1966 | Valls et al. | 260/13 |
| 3,370,025 | 2/1968 | Salo et al. | 260/13 X |
| 3,475,356 | 10/1969 | Davis et al. | 260/13 |
| 3,639,147 | 2/1972 | Benefiel et al. | 427/389.7 X |

*Primary Examiner*—Michael R. Lusignan
*Attorney, Agent, or Firm*—Wenderoth, Lind & Ponack

[57] ABSTRACT

A process for forming a metallic paint film comprising
(a) coating on a substrate surface a metallic paint containing as a vehicle component a modified vinyl-type copolymer obtained by copolymerizing 5-75 weight % of cellulose acetate butyrate with 95-25 weight % of a monomeric component consisting of one or more vinyl-type monomers,
(b) if necessary, coating a thermosetting resin-type clear topcoating while said coated metallic paint film is in the unhardened state and
(c) then baking the paint film.

12 Claims, No Drawings

METALLIC PAINTING

This is a divisional application Ser. No. 134,140, filed Mar. 26, 1980.

The present invention relates to metallic painting, and more particularly, to a process for forming a metallic paint film excellent in appearance (metallic feeling, smoothness, gloss and the like) and quality (chemical resistance, adhesive forces between coated films, adhesion to a substrate, resistance to water and weather, etc.) by metallic painting by a two-coats and one-baking process (hereinafter abbreviated to "2C-1B process") or by a one-coat and one-baking process (hereinafter abbreviated to "1C-1B process") and a novel metallic paint usable in said process.

Metallic painting by the 2-coats and 1-baking process has recently been noticed as a painting process affording excellent appearance and quality and widely used for painting of automobile and truck bodies, and various researches have been conducted for improving quality. The metallic base paint to be used for this contains in the paint metallic powders such as aluminum powders different in shape and particle diameter from ordinary pigments to reflect light and have metallic appearance.

In this metallic base paint, metallic feeling and color tone of the paint film vary depending on the way of arrangement of metallic powders in the base paint film at the time of forming the paint film. And to form a paint film rich in metallic feeling it is important for metallic powders contained in said paint to be placed in the direction of reflecting more light in the painted film, and if they are arranged in the direction of sparingly reflecting light, light is not reflected resulting in a paint film having a wholly poor metallic feeling.

Particularly, in case the viscosity of a metallic paint after the coating will not easily increase, in many cases metallic powders freely move with the movement of solvent contained there and as a result said metallic powders happen to stand in the direction of reflecting less light.

Hence, in general, it is important that for a metallic paint its viscosity rise as rapidly as possible after the coating to bar the undesirable movement of such metallic powders and several attempts for that purpose have been studied.

Especially, for a metallic paint to be used as a base paint in 2C-1B process, to obtain a good appearance, quality and finish, it is necessary that the movement of metallic powders in the base coating be suspended, that is, the metallic powders be stationary in the base coating after the metallic base paint has been applied and before a clear topcoating is applied.

For this purpose, there has sofar been a method of using a metallic base paint diluted with a highly volatile solvent with the use of acrylic resins having a comparatively great molecular weight as a vehicle and setting the movement of metallic powders by taking advantage of the rise of viscosity of said paint and the paint film at the time of, and after, coating the metallic base paint. However, this method has the disadvantages that viscosity rise after the coating is not so great, the setting of movement of metallic powders is late, and it is difficult to form a paint film rich in metallic feeling because metallic powders move and are oriented in various directions.

On the other hand, in Japanese Patent Publication No. 38005/74 there is proposed that if a cellulose acetate butyrate (hereinafter abbreviated to "CAB") is blended with the metallic base paint of this type, the viscosity rise of a paint and a paint film at the time of, and after, the coating vigorously occurs as compared with the one with CAB unblended to form a metallic paint film having an excellent appearance and high quality. However, since in general the compatibility of CAB with acrylic resins is poor, there occur troubles that the paint becomes turbid during storage or chemical seeding occur in the paint, and consequently, storage stability becomes poor. To avoid such defect it is necessary to use acrylic resins having a good compatibility with CAB, but there is a restriction in composition of monomers constituting the resins, and among them, blending of styrene monomer is highly restricted. Even if it is blended, about 5-10 weight % based on the monomer composition constituting the acrylic resin is the upper limit in practical use, and in fact, styrene monomer is scareely ever used.

On the other hand, styrene monomer as a constituting component of an acrylic resin plays a very important role in improving various properties such as metallic paint film adhesion to a substrate, adhesive force between a metallic paint film and a clear topcoated film, dispersion of pigment in a metallic paint and resistance to water, chemicals and weather of the whole metallic painting system, and the above quantitative blending restriction of styrene monomer fairly adversely affects those properties. However, the fact seems to be that the conventional metallic paints cannot but sacrifice the above properties such as adhesion to a substrate, adhesive force between coated films, pigment dispersion and resistance to water, chemicals, and weather to secure storage stability.

After conducting strenuous research with the purpose of basically improving the abovementioned disadvantages in the acrylic resin-CAB blending system in a metallic paint, the inventors have lately found that if a given copolymer of CAB with vinyl-type monomers is used as a vehicle of a metallic paint, a problem of storage stability due to the poor compatibility of CAB with acrylic resins can be solved at once and accordingly it becomes possible to lift the quantitative restriction of styrene monomer in constituting a vehicle resin and a metallic paint film can be formed, which is excellent in various properties such as adhesion to a substrate, adhesive force between a metallic paint film and a clear topcoated film and resistance to water, chemicals and weather in the whole metallic painting system, and yet a metallic paint using as a vehicle a copolymer of CAB-vinyl-type monomer has an abundance of gloss and smoothness and a capability to form a metallic paint film excellent in resistance to water, chemicals and weather even by 1C-1B process and does not particularly require the coating with a clear topcoating unlike conventional paints.

According to one aspect of the present invention, it thus provides a process for forming a metallic paint film characterized by (a) coating on a substrate surface a metallic paint containing as a vehicle component a modified vinyl-type copolymer obtained by copolymerizing 5-75 weight % of CAB with 95-25 weight % of a monomeric component consisting of one or more vinyl-type monomers, (b) coating, if necessary, a thermosetting resin-type clear topcoating while said coated metallic paint film is in the unhardened state and (c) then, baking the paint film.

According to another aspect of the present invention, the present invention provides a novel metallic paint to be used in the above process characterized by containing as a vehicle component a modified vinyl-type copolymer obtained by copolymerizing 5–75 weight % of CAB and 95–25 weight % of a monomeric component consisting of one or more vinyl-type monomers.

The process and paint in the present invention will be described in detail below.

The metallic paint of the present invention is essentially characterized by containing as a vehicle resin a copolymer of CAB and a monomeric component consisting of one or more vinyl-type monomers.

CAB is a cellulose derivative obtained by further butyl etherifying the partially acetylized one of cellulose and as CAB preferably used in the present invention are listed the ones in the range of a degree of acetylization of 1–34 weight %, preferably 1–16 weight %, more preferably 1–7 weight %, a butyl group of 16–60 weight %, preferably 25–60 weight %, more preferably 40–60 weight %, and a viscosity, determined by the testing method in ASTM-D-1343-54T, of 0.005–5 second, preferably 0.005–3 second, more preferably 0.005–1 second, and specifically are advantageously used products of Eastmen Kodak of U.S.A., eg, grades having its trade names such as EAB-171-2, EAB-381-2, EAB-531-1, EAB-551-0.2 and EAB-551-0.01 [The first two figures show the content of a butyl group (weight %), the third place of the same the content of hydroxyl and the last figure viscosity (second)], and among them EAB-551-0.2 and EAB-551-0.01 containing more butyl and having a low viscosity are preferable in view of solubility, compatibility, viscosity, etc.

As vinyl-type monomers to be compolymerized with CAB can be preferably used a radically polymerizable compound having 1–2 α,β-ethylenically unsaturated bonds, preferably only one bond, and for example, one or more can appropriately be selected from the following and used as a monomeric component.

(A) Vinyl aromatic compounds such as styrene, vinyltoluene and α-methyl styrene or other vinyl monomers such as vinyl acetate, acrylonitrile and methacrylonitrile;

(B) Alkyl or cycloalkyl esters of acrylic acid or methacrylic acid, having 1–24 carbon atoms such as methyl acrylate, methyl methacrylate, ethyl acrylate, ethyl methacrylate, n-butyl acrylate, n-butyl methacrylate, i-butyl acrylate, i-butyl methacrylate, tert-butyl acrylate, tert-butyl methacrylate, cyclohexyl acrylate, cyclohexyl methacrylate, 2-ethylhexyl acrylate, 2-ethylhexyl methacrylate, lauryl arylate, lauryl methacrylate, stearyl acrylate and stearyl methacrylate;

(C) Hydroxyalkyl esters of acrylic acid or methacrylic acid, having 1–24 carbon atoms such as 2-hydroxyethyl acrylate, 2-hydroxyethyl methacrylate hydroxypropyl acrylate and hydroxypropyl methacrylate;

(D) α,β-ethylenically unsaturated aliphatic carboxylic acids such as acrylic acid, methacrylic acid, itaconic acid and crotonic acid;

(E) Functional acrylamides or methacrylamides such as acrylamides, methacrylamides, N-methylacrylamide, N-ethylmethacrylamide and N-methylolacrylamide and N-methylolmethacrylamide; and (F) Vinyl monomers containing glycidyl such as glycidyl acrylate, glycidyl methacrylamide and allylglycidyl ether.

As a preferable example of a monomeric component according to the present invention is listed a monomeric blend obtained by combining, if necessary, with a small amount of acrylic acid or methacrylic acid a main monomeric constituent using two or more vinyl-type monomers selected from styrene, methyl methacrylate, ethyl acrylate, ethyle methacrylate, n-butyl acrylate, n-butyl methacrylate, 2-hydroxyethyl acrylate and 2-hydroxyethyl methacrylate among the above vinyl monomers, but it should be understood that the present invention is not limited to the above combination.

Particularly, as a monomeric component to be copolymerized with CAB is preferably used a monomeric mixture which contains 5–35 weight %, preferably 10–25 weight % styrene based on the total weight of said monomeric component, the rest consisting of other one or more vinyl monomers, particularly acrylic-type or methacrylic-type monomers such as methyl methacrylate, ethyl acrylate, ethyl methacrylate, n-butyl acrylate, n-butyl methacrylate, 2-hydroxyethyl acrylate and 2-hydroxyethyl methacrylate.

The ratio of copolymerization of CAB to the monomeric component consisting of the above vinyl-type monomers can widely be varied according to the composition proportion of the monomeric component to be used, but in general, there can be blended 5–75 weight %, preferably 10–50 weight %, more preferably 10–30 weight % of CAB and 95–25 weight %, preferably 90–50 weight %, more preferably 90–70 weight % of said monomeric component against CAB, based on the total weight of CAB and the monomeric component.

Copolymerization of CAB with the above monomeric component can be conducted by solution polymerization in the presence of a radical polymerization initiator.

As solvent to be used in this solution polymerization are listed alkylbenzene derivatives such as benzene, toluene and xylene, alcoholic solvents such as n-butanol and iso-butanol, acetate ester-type solvent such as butyl acetate, ethyl acetate, Cellosolve acetate and butyl Cellosolve, ketone-type solvent such as acetone and methyl-ethyl-ketone, and they can be used singly or as a mixture. And as polymerization temperature is employed temperatures in the range of about 50°–about 200° C., preferably about 80°–about 150° C.

As a radical polymerization initiator, are inter alia used preferably the type of organic peroxides, eg, peroxide polymerization initiators of peroxide type such as benzoyl peroxide, lauroyl peroxide, and dicumyl peroxide and polymerization initiators of hydroperoxide type such as tert-butyl hydroperoxide and cumene hydroperoxide, and other polymerization initiators of ketone peroxide and perester types are also usable. These polymerization initiators are added to the polymerization reaction system singly or using two or more. Further, in addition to the above peroxides, hydroperoxides, etc., polymerization initiators of azo type such as azobisisobutyronitrile may be jointly used. Particularly benzoyl peroxide is preferable.

In the copolymerization reaction using the above organic peroxides as a polymerization initiator, it is in general supposed that free radicals of the organic compounds caused by the heat decomposition of those polymerization initiators cause what is called chain transfer on a hydrocarbon compound, and with the free radicals generated on that hydrocarbon compound is initiated polymerization of vinyl-type monomers and the vinyl-type monomers grow on the hydrocarbon compound in the branched form to form a graft copolymer. In the copolymerization as well using CAB and vinyl-type monomers, it is believed that by such reaction mechanism, there is formed a graft copolymer of CAB and vinyl-type monomers.

When a vinyl-type monomer is thus grafted to the hydrocarbon compound, it is in general understood that the greater the number of grafts, that is, branches and the greater the length of branches, the more the solubility of the formed graft copolymer in organic solvent increases. In the graft copolymer in the present invention using CAB it is presumed that on the same ground the solubility of CAB and its compatibility with acrylic resins will be improved.

Further, in the present invention it is desirable that substantially all of the blended CAB be copolymerized with vinyl-type monomers, but a small amount of CAB can be, without hiderance, included as unreacted in said copolymer.

The thus formed CAB-modified vinyl-type copolymer has in general the following properties, depending on the kinds of vinyl-type monomers to be used for copolymerization.

First, there do not occur troubles that the copolymer becomes turbid during the storage owing to the poor compatibility of CAB with acrylic resins, or seeding occur in the paint.

Secondly, by the improved compatibility of CAB with acrylic resins, smoothness of the paint film turns better, and without coating a clear topcoating it becomes a paint film rich in gloss and smoothness depending on the kind of vinyl-type monomers for use in copolymerization. Thus even by 1C-1B process can be provided metallic finishes.

Thirdly, it becomes possible to use styrene monomers, which has so far been almost unusable on the grounds that it will deteriorate its compatibility with CAB, in the range of about 5-35 weight % based on the monomeric composition constituting acrylic resins. By the incorporation of this styrene monomer as a constituent component, there are expected to be improved various performances such as adhesion of a metallic paint film to a substrate, or adhesive force between a metallic paint film and a clear topcoating, dispersion of pigment in the metallic paint and resistance to water, chemicals and weather in the whole metallic painting system.

The thus prepared CAB-modified vinyl-type copolymer is used as a vehicle in the metallic paint of the present invention. The preparation of a metallic paint using said CAB-modified vinyl-type copolymer can be done by conventional techniques. For example, in an organic solvent solution of the above CAB-modified vinyl-type copolymer, there are dispersed metallic powders such as aluminum, copper, bronze, titanium dioxide-coated mica, micaceous iron oxide, nickel sulfide, cobalt sulfide, manganese sulfide, titanium nitride powders and if necessary, coloring pigments and/or other customary paint additives, for instance, a leveling agent such as Modaflow of Monsanto Chemical of U.S.A. and Acronal 4F of BASF of West Germany. Still further, if necessary, viscosity is adjusted with diluting solvent to obtain a metallic paint suitable for the process of the present invention.

As organic solvent or diluting solvent used here are listed alkylbenzene derivatives such as benzene, toluene and xylene; alcoholic solvent such as n-butanol and iso-butanol; acetate ester solvent such as butyl acetate, ethyl acetate, Cellosolve acetate and butyl Cellosolve; and ketone solvent such as acetone and methyl ethyl ketone; and they can be used singly or as a mixture. The final concentration of the above CAB-modified copolymer in the above solvent is not critical but can be widely altered upon coating conditions. In general, its concentration can be 10-80 weight %, preferably 20-40 weight % based on the weight of the paint.

And the amount of metallic powders blended is not critical either but can be extensively varied with the kinds of metallic powders. However, it can be 5-30 weight %, preferably 5-20 weight % based on the weight of the paint. As the particle diameter of metallic powders to be blended, there is in general preferable the one in the range of an average particle diameter of 3-20 microns and particle size distribution of 3-40 microns.

Still further, in the metallic paint of the present invention can be blended a hardening agent which reacts with functional groups in the above CAB-modified vinyl-type copolymer to form crosslinking structure, and in general it is desirable to do so. As a blendable hardening agent is ideal in principle the one which reacts with hydroxyl group in the CAB-modified vinyl-type copolymer to harden a paint film. Typical are conventional ones such as amino-aldehyde resins obtained with the reaction of amino compounds such as melamine, urea, benzoguanamine, acetoguanamine and spiroguanamine with aldehyde compounds; and blocked isocyanate compounds of multifunctional and no-yellowing type in which aromatic or aliphatic polyisocyanate compounds are blocked with a volatile, low-molecular active hydrogen compound.

Among them are more preferable melamineformaldehyde resins such as butylated melamine resins and methylated melamine resins. The ratio of the CAB-modified vinyl-type copolymer to the above hardening agent in this case is generally arranged in such a manner that the weight ratio of the copolymer to the hardening agent falls in the range of 60/40 to 90/10, preferably 65/35 to 80/20.

The metallic paint of the present invention can be applied to a substrate surface by conventional application methods such as air spray painting, electrostatic air spray painting and electrostatic atomized spray painting, and as the thickness of a paint film at that time, the range of about 20-50 microns, preferably 25-35 microns, is suitable as a dry paint film in the case of a metallic finish by 1C-1B process. On the other hand, in the case of a metallic finish by 2C-1B process, usually a dry paint film has the range of about 5-about 30 microns, preferably about 15-about 25 microns.

According to one embodiment of the process of this invention, the metallic dry paint film thus formed can be directly baked by a method, which will be described later on, and thereby can be formed a metallic paint film glossy, smooth, cracking-and peeling-resistant, and excellent in physical properties such as resistance to chemicals, water and weather by 1C-1B process.

However, according to the process of the present invention, in another preferable embodiment, the metallic paint film coated and dried as above can be coated with a thermosetting resin-type clear topcoating without being baked and in the unhardened state (2C-1B process).

As a thermosetting resin-type clear topcoating for use in the formation of a paint film by 2C-1B process, a thermosetting acrylic-type resin is generally preferable and the ones belonging to a type in combination of conventional functional acrylic-type copolymer and a crosslinking agent, which have a good adhesive force to a metallic base paint film and a good weatherability can be optionally selected from various types of conventional clear topcoatings without any particular limitations. There is preferably used a clear paint consisting of a type in combination of the acrylic resin containing units derived from hydroxyl functional acrylic-type monomers in the polymeric chain with the abovementioned amino resin-type across-linking agent such as butylated melamine-formaldehyde resins or methylated melamine-formaldehyde resins.

The clear topcoating usable in the process of the present invention is prepared by dissolving the above acrylic resin and crosslinking agent in organic solvent such as alkylbenzene derivatives such as benzene, toluene and xylene, alcoholic solvent such as n-butanol and isobutanol, acetate ester-type solvent such as butyl acetate, ethyl acetate, Cellosolve acetate and butyl Cellosolve, ketone solvent such as acetone and methyl ethyl ketone and petroleum mixed solvent such as "Swasol No. 1000" of Maruzen Oil Co. Ltd. in a concentration in which viscosity suitable for coating is obtained. Of course, at that time, in said clear paint can be blended paint components usually added in preparing a clear topcoating, eg, a painted surface adjustor such as silicone oil.

As a clear topcoating applied in 2C-1B process in the present invention, is particularly recommended a thermosetting acrylic resin-type one to maintain weatherability of the metallic paint film for a long time, but this is not limitative, and it is of course, possible to use other thermosetting resin-type clear topcoatings, eg, conventional paints consisting mainly of amino-alkyd resins.

Coating of such a clear topcoating can be conducted by conventional application methods such as air spray painting, electrostatic air spray painting, electrostatic atomized spray painting and electrostatic airless spray painting, and the thickness of the paint film at that time is sufficient in the range of about 10-about 50 microns, preferably about 25-about 40 microns as a dry paint film.

After the clear topcoating is applied, baking is conducted. Baking can be conducted by conventional methods, with an electric hot-air dryer, an indirect hot-air oven, a direct hot-air oven, a far infrared rays oven, etc. by maintaining the paint film at temperatures of about 80° to about 180° C. for about 15-about 45 minutes.

In this way, the process for forming a metallic paint film by 1C-1B or 2C-1B processes involved in the present invention has the advantage that a metallic paint and a clear topcoating can be easily attained at the time of painting by conventional means without needing any particular equipment, apparatus and way of use.

Further, according to the above process of the present invention, the following excellent technological effects can be produced.

First, if the metallic paint of the present invention using a CAB-vinyl-type graft copolymer containing 5-75 weight % of CAB is applied to a substrate surface, the viscosity of the coated paint rapidly rises as the diluting solvent contained in said paint volatilized. The degree of this viscosity rise becomes very great as compared with that of the one containing no CAB. This becomes a first factor of stopping early the movement of metallic powders such as aluminum powders and giving a good metallic feeling.

And since in the CAB-vinyl-type graft copolymer, the substantial solubility of CAB and its compatibility with acrylic resins have been improved, a paint film obtained with the use of the metallic paint of the present invention gets to have an excellent smoothness on the coating surface. In addition, can be obtained the effect that styrene can be conveniently employed in the vinyl-type monomer composition in the graft copolymerization system, said styrene which has not substantially been used in the copolymerization system for various reasons such as the deterioration of compatibility and the occurrences of the turbidity of the coat and the blisters or seedings caused by the coalescence of CAB, or which has been used only by 5-10 weight % or below in monomer constitution even if used.

Since styrene is a monomeric component to give a polymer excellent in resistance to chemicals and water and further has a function of reinforcing adhesion to a substrate and adhesive force to a thermosetting resin-type clear topcoating to be applied if necessary, when a CAB-vinyl-type graft copolymer, which containes as much as 5-35 weight % of styrene based on the total weight of the monomeric component is in use as a vehicle, there is a great advantage that in addition to the improvement of finish appearance of the painting system of this invention, durability performance of the whole metallic paint film is improved because resistance to chemicals and water, adhesion to a substrate and adhesive force to a clear topcoated paint film are particularly improved.

In the present invention, the predetermined object is attained by causing the abovementioned CAB-vinyl-type graft copolymer to be contained in a metallic paint containing metallic powders, but the usefulness of said graft copolymer is not limited only to the case of a metallic paint film but in the case of a non-metallic paint film, that is, a solid color paint film using an ordinary coloring pigment as well, it can also be applied for use in a finish of 1C-1B or 2C-1B coating process in which good adhesion to a substrate and to a thermosetting acrylic resin-type topcoating, good resistance to water and weather in the coating system should be maintained.

The present invention will be described in detail below with reference to Examples and Comparative examples. The parts and % in Examples are all by weight.

Preparation of CAB-vinyl-type graft copolymer solution:

Manufacturing Example 1

The following components were charged in a reaction vessel provided with a thermometer, an agitator, a reflux condenser and a dropping funnel:

| | |
|---|---|
| Xylol | 48 parts |
| n-Butanol | 12 |
| EAB-551-0.2 | 20 |
| | Total: 80 parts |

The above mixture was heated in an atmosphere of purified nitrogen gas to 110° C. in about one hour. On checkup of temperature at 110° C. and of the complete dissolution of CAB, a mixed solution of vinyl-type monomers and a polymerization initiator in the following recipe was dropwise added to the CAB solution in 3 hours.

| | |
|---|---|
| Styrene | 20 parts |
| Methylmethacrylate | 14 |
| n-Butyl methacrylate | 52 |
| 2-Hydroxyethyl methacrylate | 13 |
| Acrylic acid | 1 |
| Xylene | 10 |
| Benzoyl peroxide | 2 |
| Total: | 112 parts |

30 Minutes after the dropping, 0.5 part of azobisisobutyronitrile was added, and further in an nitrogen atmosphere of purified nitrogen at 110° C. for 2 hours 50 parts of xylol and 26.7 parts of butyl acetate were added to obtain CAB-vinyl-type graft copolymer solution A with 45% of the solid content. The copolymer solution was colorless and transparent and Gardner bubble viscosity (25° C.) was V.

Manufacturing Example 2-20

CAB-vinyl-type copolymer solutions B-G and K-Q were manufactured by the manufacturing process for CAB-vinyl-type graft copolymer solution A in Manufacturing Example 1. However, for comparison, resin solutions H-J manufactured in Manufacturing Examples 8-10 and resin solutions R-T in Manufacturing Examples 18-20 are acrylic resin solutions containing no CAB.

The manufacturing process followed the polymerization process for the vinyl-type monomer in Manufacturing Example 1.

The composition of vinyl-type monomers, the amount of CAB (EAB-551-0.2 of Eastman Kodak), concentration of solid content in the solution (weight %) and Gardner bubble viscosity (25° C.), of the CAB-vinyl-type copolymer and the vinyl-type copolymer containing no CAB, are given in Table 1, Manufacturing Example I being included.

In Table 1, for solutions A-J in Manufacturing Examples 1-10, testing by 1C-1B process was conducted and for solutions K-T in Manufacturing Examples 11-20, testing by 2C-1B process was conducted.

TABLE 1

| | | For testing by 1C-1B coating process | | | | | | | | | |
|---|---|---|---|---|---|---|---|---|---|---|---|
| Manufacturing example | | 1 | 2 | 3 | 4 | 5 | 6 | 7 | 8 | 9 | 10 |
| Name of solutions | | A | B | C | D | E | F | G | H | I | J |
| Vinyl monomer composition (parts) | Styrene | 20 | 0 | 30 | 20 | 20 | 20 | 20 | 0 | 20 | 30 |
| | Methyl methacrylate | 14 | 34 | 4 | 14 | 14 | 14 | 14 | 34 | 14 | 4 |
| | n-Butyl methacrylate | 52 | 52 | 52 | 52 | 52 | 52 | 52 | 52 | 52 | 52 |
| | Ethyl methacrylate | | | | | | | | | | |
| | 2-Hydroxyethyl methacrylate | 13 | 13 | 13 | 13 | 13 | 13 | 13 | 13 | 13 | 13 |
| | Acrylic acid | 1 | 1 | 1 | 1 | 1 | 1 | 1 | 1 | 1 | 1 |
| | EAB-551-0.2 | 20 | 20 | 20 | 10 | 40 | 100 | 200 | — | — | — |
| Solvent composition (parts) | Xylol | 108 | 108 | 108 | 99 | 126 | 180 | 270 | 90 | 90 | 90 |
| | Toluol | | | | | | | | | | |
| | n-Butanol | 12 | 12 | 12 | 11 | 14 | 20 | 30 | 10 | 10 | 10 |
| | Butyl acetate | 26.7 | 26.7 | 26.7 | 24.4 | 31.1 | 100 | 150 | | | |
| Concentration of solid content in solutions (weight %) | | 45 | 45 | 45 | 45 | 45 | 40 | 40 | 50 | 50 | 50 |
| Viscosity of solutions (Gardner bubble viscosity at 25° C.) | | V | W | U | S-T | $Z_2$ | Y | $Z_3$ | V-W | V | U |
| Clearness of coat | Solution dried as it is (after heating at 130° C. for 3 hours) | ⊙ | ⊙ | ⊙ | ⊙ | ⊙ | ⊙ | ⊙ | | | |
| | Dried by mixing 20% of EAB-551-0.2 based on the solid content (100%) of solution (heated at 130° C. for 3 hours) | — | — | — | — | — | — | — | ⊙ | Δ | X |

| | | For testing by 2C-1B coating process | | | | | | | | | |
|---|---|---|---|---|---|---|---|---|---|---|---|
| Manufacturing example | | 11 | 12 | 13 | 14 | 15 | 16 | 17 | 18 | 19 | 20 |
| Name of solutions | | K | L | M | N | O | P | Q | R | S | T |
| Vinyl monomer composition (parts) | Styrene | 20 | 0 | 30 | 20 | 20 | 20 | 20 | 0 | 20 | 30 |
| | Methyl methacrylate | 20 | 40 | 10 | 20 | 20 | 20 | 20 | 40 | 20 | 10 |
| | n-Butyl methacrylate | | | | | | | | | | |
| | Ethyl methacrylate | 47 | 47 | 47 | 47 | 47 | 47 | 47 | 47 | 47 | 47 |
| | 2-Hydroxyethyl methacrylate | 12 | 12 | 12 | 12 | 12 | 12 | 12 | 12 | 12 | 12 |
| | Acrylic acid | 1 | 1 | 1 | 1 | 1 | 1 | 1 | 1 | 1 | 1 |
| | EAB-551-0.2 | 20 | 20 | 20 | 10 | 40 | 100 | 200 | — | — | — |
| Solvent composition (parts) | Xylol | 70 | 70 | 70 | 60 | 90 | 100 | 150 | 50 | 50 | 50 |
| | Toluol | 25 | 25 | 25 | 25 | 25 | 50 | 100 | 25 | 25 | 25 |
| | n-Butanol | 25 | 25 | 25 | 25 | 25 | 50 | 50 | 25 | 25 | 25 |
| | Butyl acetate | 26.7 | 26.7 | 26.7 | 24.4 | 31.1 | 100 | 150 | | | |
| Concentration of solid content in solutions (weight %) | | 45 | 45 | 45 | 45 | 45 | 40 | 40 | 50 | 50 | 50 |
| Viscosity of solutions (Gardner bubble viscosity at 25° C.) | | X | Y | W-X | V | $Z_4$ | Z | $Z_6$ | V | V-W | W |
| Clearness of coat | Solution dried as it is (after heating at 130° C. for 3 hours) | ⊙ | ⊙ | ⊚ | ⊙ | ⊙ | ⊙ | ⊙ | | | |
| | Dried by mixing 20% of EAB-551-0.2 based on the solid content (100%) of solution (heated at | | | | | | | | ⊙ | Δ | X |

TABLE 1-continued

130° C. for 3 hours)

Note:
Clearness of coat:
Estimation is made for coats obtained by applying solutions on a transparent glass sheet, allowing them to stand, and heating them at 130° C. for 3 hours.
◎ : Clearness
◉ : Extent to which it is slightly stained
Δ: Slightly stained
X: Turbid (separation of components)

Preparation of Metallic Paint

(1) Metallic paint A

Metallic paint A was prepared with the use of CAB-vinyl-type graft copolymer solution A by the following blending:

| | |
|---|---|
| CAB-vinyl-type graft copolymer solution A | 222.2 parts |
| Butylated melamine resin solution (Note 1) | 55.6 |
| Aluminum paste (Note 2) | 10 |
| Carbon black (Note 3) | 0.2 |
| Cyanine Blue (Note 4) | 0.5 |
| Total: | 288.5 parts |

(Note 1):
Tradename; Super Beckamin J-820 of Dainippon Ink and Chemicals, Inc., Japan Solid content: 60%
(Note 2):
Trade name: Alumipaste 1109 MA of Toyo Aluminum K.K., Japan
(Note 3):
Trade name: Neospectra Beads AG of Columbia Carbon Inc., U.S.A.
(Note 4):
Trade name: Cyanine Blue No. 5030 SA of Dainippon Ink and Chemicals, Inc., Japan Then, the viscosity of this metallic paint A was adjusted to 18 seconds (Ford cup No. 4/20° C.) by mixed solvent consisting of 40 parts of toluene, 30 parts of Swasol No. 1000, 20 parts of ethyl acetate and 10 parts of n-butanol.

(2) Metallic paints B-Z

Metallic paints B-J and N-W were prepared following the blending of metallic paint A with the use of CAB-vinyl-type graft copolymer solutions B-G and K-Q and acrylic resin solutions H-J and R-T containing no CAB (for comparison).

Further, to compare the CAB-vinyl-type graft copolymer system with the system in simple blending of CAB with acrylic resins, CAB was blended with acrylic resin solutions H-J and R-T so that the content of EAB-551-0.2 might be 20%, and metallic paint K-M and X-Z were prepared. In this case, EAB-551-0.2 was used in the form of a 30% solution arranged by mixed solvent consisting of 40 parts of toluol, 40 parts of ethyl acetate, 10 parts of n-butanol and 10 parts of xylol.

Further, metallic paints A-M were prepared for making tests by 1C-1B process, and the viscosity of the paints was adjusted to 18 seconds (Ford cup No. 4/20° C.) with the mixed solvent which was used for the manufacture of metallic paint A.

Still further, metallic paints N-Z were prepared for making tests by 2C-1B process and the viscosity of the paints was adjusted to 14 seconds (Ford cup No. 4/20° C.) with the mixed solvent which was used for the manufacture of metallic paint A.

The blending of these metallic paints A-Z and the concentration (weight %) of solid content at the time of painting are given in Tables 2 and 3.

TABLE 2

| Name of metallic paint | | A | B | C | D | E | F | G | H | I | J | K | L | M |
|---|---|---|---|---|---|---|---|---|---|---|---|---|---|---|
| CAB-vinyl-type graft copolymer solution | A | 222.2 | | | | | | | | | | | | |
| | B | | 222.2 | | | | | | | | | | | |
| | C | | | 222.2 | | | | | | | | | | |
| | D | | | | 222.2 | | | | | | | | | |
| | E | | | | | 222.2 | | | | | | | | |
| | F | | | | | | 250 | | | | | | | |
| | G | | | | | | | 250 | | | | | | |
| 50% acrylic resin solution | H | | | | | | | | 200 | | | | | |
| | I | | | | | | | | | 200 | | | | |
| | J | | | | | | | | | | 200 | | | |
| | H | | | | | | | | | | | 160 | | |
| | I | | | | | | | | | | | | 160 | |
| | J | | | | | | | | | | | | | 160 |
| 30% CAB solution | | | | | | | | | | | | 66.7 | 66.7 | 66.7 |
| 60% Super Beckamin J-820 | | 55.6 | 55.6 | 55.6 | 55.6 | 55.6 | 55.6 | 55.6 | 55.6 | 55.6 | 55.6 | 55.6 | 55.6 | 55.6 |
| Pigments | Alumipaste 1109 MA | 10 | 10 | 10 | 10 | 10 | 10 | 10 | 10 | 10 | 10 | 10 | 10 | 10 |
| | Neospectra beads AG | 0.2 | 0.2 | 0.2 | 0.2 | 0.2 | 0.2 | 0.2 | 0.2 | 0.2 | 0.2 | 0.2 | 0.2 | 0.2 |
| | Cyanine blue #5030SA | 0.5 | 0.5 | 0.5 | 0.5 | 0.5 | 0.5 | 0.5 | 0.5 | 0.5 | 0.5 | 0.5 | 0.5 | 0.5 |
| Concentration of solid content at the time of painting (%) | | 28.0 | 26.7 | 29.2 | 30.6 | 24.5 | 23.0 | 21.2 | 30.6 | 31.0 | 31.5 | 26.5 | 27.1 | 29.1 |

TABLE 3

| Name of metallic paint | | N | O | P | Q | R | S | T | U | V | W | X | Y | Z |
|---|---|---|---|---|---|---|---|---|---|---|---|---|---|---|
| CAB-vinyl-type graft co-polymer solution | K | 222.2 | | | | | | | | | | | | |
| | L | | 222.2 | | | | | | | | | | | |
| | M | | | 222.2 | | | | | | | | | | |
| | N | | | | 222.2 | | | | | | | | | |
| | O | | | | | 222.2 | | | | | | | | |
| | P | | | | | | 250 | | | | | | | |
| | Q | | | | | | | 250 | | | | | | |
| 50% acrylic resin solution | R | | | | | | | | 200 | | | | | |
| | S | | | | | | | | | 200 | | | | |
| | T | | | | | | | | | | 200 | | | |
| | R | | | | | | | | | | | 160 | | |
| | S | | | | | | | | | | | | 160 | |
| | T | | | | | | | | | | | | | 160 |
| 30% CAB solution | | | | | | | | | | | | 66.7 | 66.7 | 66.7 |
| 60% Super Beckamin J-820 | | 55.6 | 55.6 | 55.6 | 55.6 | 55.6 | 55.6 | 55.6 | 55.6 | 55.6 | 55.6 | 55.6 | 55.6 | 55.6 |
| Pigments | Alumipaste 1109 MA | 10 | 10 | 10 | 10 | 10 | 10 | 10 | 10 | 10 | 10 | 10 | 10 | 10 |
| | Neospectra beads AG | 0.2 | 0.2 | 0.2 | 0.2 | 0.2 | 0.2 | 0.2 | 0.2 | 0.2 | 0.2 | 0.2 | 0.2 | 0.2 |
| | Cyanine blue #5030SA | 0.5 | 0.5 | 0.5 | 0.5 | 0.5 | 0.5 | 0.5 | 0.5 | 0.5 | 0.5 | 0.5 | 0.5 | 0.5 |
| Concentration of solid content at the time of painting (%) | | 26.0 | 25.7 | 26.5 | 26.4 | 24.5 | 22.5 | 20.8 | 28.0 | 28.5 | 27.0 | 25.0 | 24.8 | 25.5 |

Preparation of resin solution for use in thermosetting acrylic resin-type clear topcoating 45 parts of aromatic petroleum solvent (Trade name: Swasol No. 1000 of Maruzen Oil Co. Ltd.) was charged in a reaction vessel provided with a thermometer, an agitator, a reflux condenser and a dropping funnel and heated in an atmosphere of purified nitrogen and the supply of the nitrogen gas was suspended when the temperature reached 120° C. Then, the following mixed solution of vinyl-type and acrylic-type monomers and polymerization initiators was added dropwise in 3 hours.

| | |
|---|---|
| Styrene | 30 parts |
| n-Butyl methacrylate | 22 |
| Lauryl methacrylate | 30 |
| 2-Hydroxylmethacrylate | 15 |
| Methacrylic acid | 3 |
| n-Butanol | 15 |
| Azobisisobutyronitrile | 2 |
| Total: | 117 parts |

Manufacture of thermosetting acrylic resin-type clear topcoating

A thermosetting acrylic resin-type clear topcoating was prepared by the following blending, using the aforementioned acrylic resin solution for use in a clear topcoating.

| | |
|---|---|
| 50% acrylic resin solution for use in clear topcoating | 140 parts |
| 60% Super Beckamin J-820 | 50 |
| Total: | 190 parts |

Then, the viscosity of this clear paint was adjusted to 30 seconds (Ford cup No. 4/20° C.) with Swasol No. 1000. The solid content of this paint at the time of coating was 41%.

EXAMPLE 1

A polybutadiene-type electro-depositable primer (Trade name: ELECRON No. 6000 of Kansai Paint Co., Ltd., Japan) was electrocoated on a dull steel palte, 0.8 mm thick chemically treated with zinc phosphate so that the dry paint film might be about 20μ thick and baked at 170° C. for 20 minutes. Then, the primer was polished with No. 400 sand paper and degreased by wiping it with petroleum benzine. Then, an amino-alkyd resin-type surfacer for automobile bodies (Trade name: Amilac Surfacer of Kansai Paint Co., Ltd.) was coated by air spraying and baked at 140° C. for 30 minutes. Then, it was water sanded with No. 400 sand paper, hydro-extracted and dried. This was wiped with petroleum benzine, degreased and made into a metallic plate for testing.

On this material was applied metallic paint A by the following coating conditions. [Coating conditions]

| | |
|---|---|
| Temperature and humidity of coating base: | 23° C. 75 RH |
| Coater: Electrocoater Auto REA (Japan Ransburg K.K.) | |
| Atomized air pressure: (Pressure at the gun at the time of spray) | 5 kg/cm² |
| Amount of discharge: | 400 cc/min. |
| Thickness of paint film: | 30–40μ (thickness of dried paint film) |

After the coating of a metallic paint, the coat was allowed to stand at room temperature for ten minutes and then heated and hardended at 140° C. for 30 minutes with an electric hot air dryer. The obtained coated plate was excellent in metallic feeling. This is called test coated plate No. 1.

EXAMPLES 2–7 AND COMPARATIVE EXAMPLES 1–6

Test coated plates 2-13 were prepared under the same conditions that test coated plate No. 1 was prepared. Test coated plates Nos. 2–7 correspond to Example 2–7 and test coated plates Nos. 8–13 to Comparative Examples 1–6. Kinds of metallic paints used for preparing individual test coated plates, important points of composition of a CAB-vinyl-type graft copolymer and an acrylic resin, which are used for the metallic paints, and the test coated plates are given in Table 4 below.

EXAMPLES 8–14 AND COMPARATIVE EXAMPLES 7–12

Metallic paints were coated in the same way as in Example 1 to obtain a dry film, $20\pm2\mu$ thick. The above thermosetting acrylic resin-type clear topcoating was applied to obtain a dry film, $30\pm2\mu$ thick in the same coating conditions as in said metallic paint. The topcoating was allowed to stand at room temperature for 10 minutes and hardened by heating at 140° C. for 30 minutes with an electric hot air dryer to prepare test coated plates Nos. 14–20. These plates correspond to Examples 8–14 and test coated plates Nos. 21–26 to Comparative Examples 7–12. Kinds of metallic paints used for the preparation of individual test coated plates, important points of compositions of the CAB-vinyl-type graft copolymer and acrylic resin used for the metallic paints and the performance test results of the test coated plates are given in Table 5.

TABLE 4

(Test results by 1C-1B coating process)

| | No. of test coated plate | Name of metallic paints | Characteristics, etc. OF CAB-vinyl-type graft copolymer | | | Evaluation of finish appearance | | | Resistance to chemicals 10% $H_2SO_4$, 50° C. × 90 minutes, spot (Note 3) |
|---|---|---|---|---|---|---|---|---|---|
| | | | No. | Amount of CAB (parts) | Amount of styrene in vinyl monomer system (parts) | Metallic feeling of paint film (Note 1) | Smoothness of coated surface (Note 2) | 60° specular reflectance (%) | |
| Example No. 1 | 1 | A | A | 20 | 20 | ⊙ | ⊙ | 93 | Normal |
| 2 | 2 | B | B | 20 | 0 | ⊙ | ⊙ | 94 | Slightly tarnished |
| 3 | 3 | C | C | 20 | 30 | ⊙ | ⊙ | 92 | Normal |
| 4 | 4 | D | D | 10 | 20 | ⊙ | ⊙ | 93 | Normal |
| 5 | 5 | E | E | 40 | 20 | ⊙ | ⊙ | 95 | Normal |
| 6 | 6 | F | F | 100 | 20 | ⊙ | ⊙ | 94 | Normal |
| 7 | 7 | G | G | 200 | 20 | ⊙ | ⊙ | 94 | Normal |
| Comparative Example No. 1 | 8 | H | H | — | 0 | ⓐ | | 88 | Tarnished and blisters |
| 2 | 9 | I | I | — | 20 | Δ | ○ | 86 | Normal |
| 3 | 10 | J | J | — | 30 | X | ○ | 86 | Normal |
| 4 | 11 | J | H | 20 (Cold blending) | 0 | ⊙ | ⊙ | 91 | Tarnished and blisters |
| 5 | 12 | L | I | 20 (Cold blending) | 20 | Δ | Δ | 72 | Normal |
| 6 | 13 | M | J | 20 (Cold blending) | 30 | X | X | Occurrence of seedings 61 | No testing conducted |

| | Moisture test (Note 4) | | Weather test (Note 5) (S.W.O.M. × 1000H) | | | | Adhesive test between coated films (Crosscut test) | |
|---|---|---|---|---|---|---|---|---|
| | State of coated surface | Adhesive test between coated films | Gloss retention (%) | 10% $H_2SO_4$, 50° × 90 minutes spot | Moisture test | | No dipping in warm water | After dipping in warm water for 240 hours |
| | | | | | State of ciated surface | Adhesive test between coated films | | |
| Example No. 1 | Normal | Normal | 92 | Normal | Normal | Normal | Normal | Normal |
| 2 | Normal | Normal | 93 | Tarnished | Tarnished | Normal | 1 | 1 |
| 3 | Normal | Normal | 91 | Normal | Normal | Normal | 1 | 1 |
| 4 | Normal | Normal | 92 | Normal | Normal | Normal | 1 | 1 |
| 5 | Normal | Normal | 91 | Normal˜ | Normal | Normal | 1 | 1 |
| 6 | Normal | Normal | 91 | Normal | Normal | Normal | 1 | 1 |
| 7 | Normal | Normal | 91 | Normal | Normal | Normal | 1 | 1 |
| Comparative Example No. 1 | Occurrence of blister | Partial peeling | 76 | Tarnished and blisters | Occurrence of blister | Partial peeling | Partial peeling | Partial peeling |
| 2 | Normal | Normal | 72 | Tarnished and blisters | Occurrence of blister | Partial peeling | Normal | Normal |
| 3 | Normal | Normal | 70 | Tarnished and blisters | Occurrence of blister | Normal | Normal | Normal |
| 4 | Occurrence of blister | Partial peeling | 83 | Tarnished and | Occurrence of | Partial peeling | Partial peeling | Partial peeling |

TABLE 4-continued

| | | | | blister Tarnished and blisters | blister Occurrence of blister | | | |
|---|---|---|---|---|---|---|---|---|
| 5 | Normal | Normal | 70 | | | Normal | Normal | Normal |
| 6 | | | | No testing conducted | | | | |

Notes 1 and 2: Standards of evaluation are as follows:
⊙ : Very good
○ : Good
⊿ : Slightly good
△: Slightly poor
X: Poor
Note 3: Tests were made as follows:
Chemicals: 10% (weight) Aqueous solution of $H_2SO_4$
Spot: 5 drops were spotted on each coated plate
Temperature: 50° C.
Time: 90 minutes
Evaluation: Blisters on paint film, tarnish
Note 4:
Each coated plate was dipped in water at 40° C. for 240 hours and 30 minutes after pulling up, the state of coated surface was observed. At the same time peeling test of adhesive tape at the cross-cut portions was conducted.
Note 5:
Each coated plate was placed in a Sunshine-type weather Ometer (S.W.O.M.) and irradiated for 1,000 hours. Then, gloss retention was measured.

TABLE 5

(Test results by 2C-1B coating process)

| | | | Characteristics, etc. of CAB-vinyl-type graft copolymer | | | Evaluation of finish appearance | | |
|---|---|---|---|---|---|---|---|---|
| No. of test coated plate | Name of metallic paints | No. | Amount of CAB (parts) | Amount of styrene in vinyl monomer system (parts) | | Metallic feeling of paint film | Smoothness of coated surface | 60° specular reflectance (%) |

| Example No. | | | | | | | | |
|---|---|---|---|---|---|---|---|---|
| 8 | 14 | N | K | 20 | 20 | ⊙ | ⊙ | 98 |
| 9 | 15 | O | L | 20 | 0 | ⊙ | ⊙ | 96 |
| 10 | 16 | P | M | 20 | 30 | ○ | ○ | 92 |
| 11 | 17 | Q | N | 10 | 20 | ⊙ | ○ | 96 |
| 12 | 18 | R | O | 40 | 20 | ⊙ | ○ | 97 |
| 13 | 19 | S | P | 100 | 20 | ⊙ | ○ | 98 |
| 14 | 20 | T | Q | 200 | 20 | ⊙ | ○ | 98 |
| Comparative Example No. | | | | | | | | |
| 7 | 21 | U | R | — | 0 | △ | ⊿ | 90 |
| 8 | 22 | V | S | — | 20 | △ | ⊿ | 88 |
| 9 | 23 | W | T | — | 30 | △ | ⊿ | 88 |
| 10 | 24 | X | R | 20 (Cold blending) | 0 | ○ | ○ | 93 |
| 11 | 25 | Y | S | 20 (Cold blending) | 20 | △ | △ | 81 |
| 12 | 26 | Z | T | 20 (Cold blending) | 30 | X | X | Occurrence of seedings 64 |

| | Resistance to chemicals 10% $H_2SO_4$, 50° C. × 90 minutes, spot | Moisture test | | Weather test (S.W.O.M. × 2300H) | | |
|---|---|---|---|---|---|---|
| | | Adhesive test between coated films | State of coated surface | Gloss retention (%) | Adhesive test between coated films (Crosscut test) | |
| | | | | | No dipping in warm water | After dipping in warm water for 240 hours |

| Example No. | | | | | | |
|---|---|---|---|---|---|---|
| 8 | | | | 89 | | |
| 9 | Slightly tarnished | | | 88 | | |
| 10 | | | | 89 | | |
| 11 | | | | 86 | | |
| 12 | | | | 89 | | |
| 13 | | | | 90 | | |
| 14 | | | | 90 | | |
| Comparative Example No. | | | | | | |
| 7 | Tarnished and blisters | Partial peeling | Occurrence of blister | 77 | Partial peeling | Partial peeling |
| 8 | Slightly tarnished | | | 81 | Partial peeling | Partial peeling |
| 9 | | | | 82 | Partial peeling | Partial peeling |
| 10 | Tarnished and blisters | Partial peeling | Occurrence of blister | 82 | Partial peeling | Partial peeling |

TABLE 5-continued

| 11 | 75 | Partial peeling | Partial peeling |
|----|----|----|----|
| 12 | No testing conducted | | |

: Normal

The more uniform and the evener the coating surface and the glossier the metallic feeling, the better it is.

Further, with respect to the coated plates in Examples 8–14 and Comparative Examples 7–11, after they were irradiated for 2300 hours with a weather Ometer, gloss retention was measured.

And after the state of the coated surface was observed, the half of the coated plates were dipped in water at 40° C. for 240 hours. 30 Minutes after pulling up from the water, adhesive test by adhesive tape peeling at the crosscut portion was conducted. The remaining half were cross cut at intervals of 1 mm and peeling of adhesive tape was conducted.

Examples 1–7 and 8–14 show metallic finish of the present invention. And Examples 1–7 involve finishing by 1C–1B coating process and Examples 8–14 by 2C–1B coating process. Among them, Examples 2 and 9 do not contain at all styrene in the vinyl-type monomer and are slightly inferior to other Examples in resistance to chemicals. In Examples 6, 7, 13 and 14, as a feature of the CAB-vinyl-type graft copolymer, 100 parts and 200 parts of CAB are respectively contained per 100 parts of the vinyl-type monomeric component, the amount of CAB being made great, resulting in the state of coating surface and paint coated film performance being excellent. However, as given in Tables 2 and 3, there is the disadvantage that concentration of solid content at the time of painting becomes small.

Comparative Examples 1–6 finishing by 1C–1B coating process and Comparative Examples 7–12 by 2C–1B coating process. Among them, Comparative Examples 1–3 and 7–9 do not contain CAB and the amounts of styrene are respectively, 0.20 and 30%. In Comparative Examples 1 and 7, with 0% of styrene, the compatibility with EAB-551-0.2 added by 20% is good (See Manufacturing Examples 8–10 and 18–20 in Table 1), but finish appearance and other performances become poor. In like manner, Comparative examples 2–3 and 8–9 contain styrene by 20% and 30%, respectively and compatibility with EAB-551-0.2 gets much deteriorated with occurence of stains and separation of components (See Table 1) and like Comparative Examples 1 and 7, finish appearance and other performances are deteriorated.

Further, Comparative Examples 4–6 and 10–12 show could blending in such a manner that EAB-551-0.2 is contained by 20%, but the ones which do not contain styrene at all improve finish appearance with the addition of CAB as compared with those in Comparative Examples 1 and 7, but in performance test results, defects are still shown. Further, in Comparative Examples 5–6 and 11–12, which contain styrene by 20% and 30%, stains and occurence of seedings (separation of layers) are seen with the addition of CAB, and particularly Comparative Examples 6 and 12 show very bad states of coated surface and performance test is not conducted.

The effect of the present invention is obvious by the above Examples and Comparative Examples.

What is claimed is:

1. A metallic paint comprising:
   (a) a modified vinyl-type copolymer obtained by copolymerizing 5–75% by weight of cellulose acetate butyrate with 95–25% by weight of a monomer component consisting of one or more vinyl-type monomers, as a vehicle component,
   (b) a metallic powder, and
   (c) an organic solvent.

2. The paint of claim 1 wherein said modified vinyl-type copolymer is obtained by copolymerizing 10–50 weight% of cellulose acetate butyrate with 90–50 weight% of a monomeric component consisting of one or more of said vinyl-type monomers.

3. The paint of claim 1 wherein said cellulose acetate butyrate has a degree of acetylation of 1–34 weight% and a butyl group content of 16–60 weight%.

4. The paint of claim 1 wherein said cellulose acetate butyrate has viscosity in the range of 0.005–5 second.

5. The paint of claim 1 wherein said monomeric component consists mainly of at least two monomers selected from styrene, methyl methacrylate, ethyl methacrylate, butyl methacrylate and 2-hydroxyethyl methacrylate.

6. The paint of claim 1 wherein said monomeric component contains 5–35 weight% of styrene based on the total weight of said monomeric component, the rest being a monomeric mixture consisting of one or more vinyl-type monomers.

7. The paint of claim 6 wherein said other vinyl-type monomers are selected from methyl methacrylate, ethyl methacrylate, butyl methacrylate and 2-hydroxyethyl methacrylate.

8. The paint of claim 1 wherein said modified vinyl-type copolymer is obtained by copolymerizing said cellulose actetate butyrate with said monomeric component in the presence of a hydroperoxide type and/or a peroxidetype polymerization initiator.

9. The paint of claim 1 wherein said metallic paint further contains a hardening agent.

10. The paint of claim 9 wherein said hardening agent is an aminoaldehyde resin or blocked isocyanate.

11. The paint of claim 1 wherein said metallic paint contains 10–80 weight% of said modified vinyl-type copolymer based on the weight of said paint.

12. The paint of claim 1 wherein said metallic paint contains 5–30 weight% of metallic powders based on the weight; of said paint.

* * * * *